June 18, 1957 G. F. HUETHER ET AL 2,796,001
FIXED FOCUS VARIABLE MAGNIFICATION OPTICAL
SYSTEM AND FOCUSING DEVICE
Filed June 10, 1954
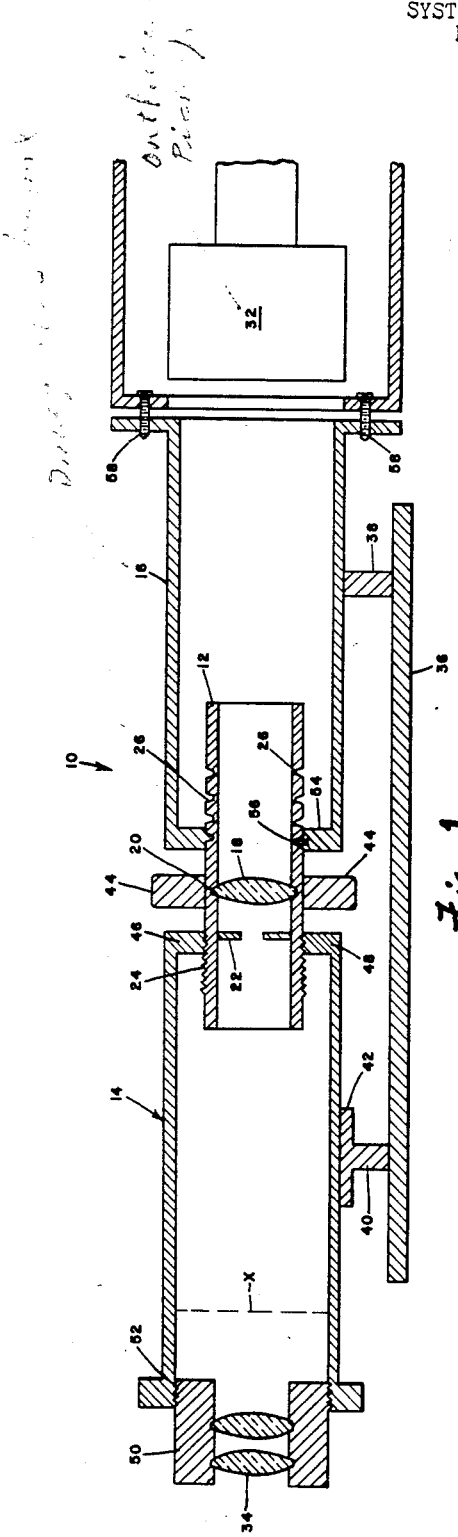
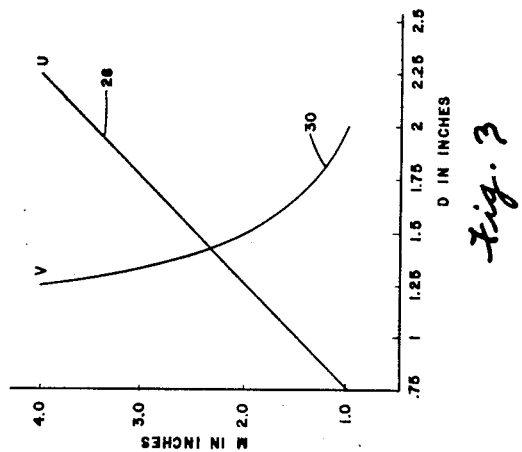
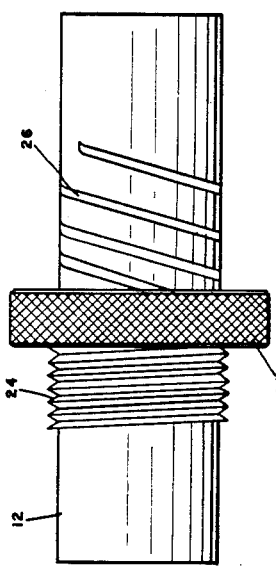
INVENTORS
GEORGE F. HUETHER
GILBERT G. STRUBEL
BY
R. I. Tompkins
ATTORNEYS

2,796,001
FIXED FOCUS VARIABLE MAGNIFICATION OPTICAL SYSTEM AND FOCUSING DEVICE

George F. Huether, Albertson, and Gilbert G. Strubel, Glen Head, N. Y.

Application June 10, 1954, Serial No. 435,952

3 Claims. (Cl. 88—57)

(Granted under Title 35, U. S. Code (1952), sec. 266)

The invention described herein may be manufactured and used by or for the Government of the United States of America for governmental purposes without the payment of any royalties thereon or therefor.

The invention relates to a device designed to magnify an optical image over a wide range and at the same time retain the correct focus.

Various systems have been employed in attempting to achieve the same results. Complex optical combinations involving the use of a number of movable elements, each individually adjusted in relation to each other and to the fixed lenses have been devised but require a complex adjusting mechanism, costly and liable to introduce distortion. Simpler systems move some of the lenses, but such systems are a focal only in too extreme setting of the moved lenses. Other methods employ separate lenses mounted on a turret for changing them. Such systems are limited in use.

The present device overcomes these inadequacies and allows a wide range of magnification of an optical image while retaining the depth of focus constant. By providing simple cam operating means, the reproduction lens and camera lens are moved in a predetermined ratio to each other to both magnify the object and retain the required focus at all times.

It is an object of the invention to magnify an image over a wide range while maintaining the focus constant at all times.

It is another object of the invention to make it possible, by means of a single operation, to vary the distances between the subject and the image while maintaining the focus constant during magnification.

Correspondingly, it is a further object of the invention to avoid the necessity for use of separate lenses or large optical apparatus with many optical elements in order to attain the required magnification and constant focus.

It is still another object of the invention to provide a simplified structure with a minimum of moving parts and one economical to manufacture without sacrificing durability.

It is a feature of the invention to provide a movable lens of short focal length which is rotated to vary the distance from the subject and the distance from the image at a predetermined rate of speed so that magnification is carried out without necessitating constant re-focusing.

It is a further feature of the invention that because of the provision of simplified equipment which is operated to automatically provide a constant focus with magnification, the necessity for using highly technical operators is avoided, and the desired results are carried out by less skilled technicians.

Other objects and many of the attendant advantages of this invention will be readily appreciated as the same becomes better understood by reference to the following detailed description when considered in connection with the accompanying drawings wherein:

Fig. 1 is a horizontal, sectional view of an optical system of the invention,

Fig. 2 is a side view of the adjusting cylinder, and

Fig. 3 is a chart illustrating graphically the operation of the device of the invention.

Referring to the figures, the magnification device 10 comprises a movable or adjustable lens cylinder 12 rotatively connected to a subject lens barrel 14 and to an image housing barrel 16.

Cylinder 12 retains a lens assembly 18 seated at 20 within the cylinder at a point intermediate the open extremities thereof. A suitable diaphragm 22 is provided. Lens 18 is of short focal length and, in the preferred form, is about 25 mm. in length. Obviously, other lenses of desired focal length may be substituted without departing from the scope of the invention.

Cylinder 12 is threaded externally at 24 on the surface adjacent the subject lens barrel 14 and is adapted to threadedly engage the barrel, as will presently appear. A curved cam groove or track 26 is provided on the outer surface of cylinder 12 adjacent the image housing 16. This groove is of spiral form, the spiral increasing in pitch outwardly from the lens 18.

The pitch of threads 24 and the pitch of the cam groove or slot 26 are determined to give the desired travel ratio as lens 18 is rotated. Thus, the image size is constantly varied without defocussing at any time. The usual methods of calculation, which integrate the optical constants of the lenses, the distance between the fixed lenses, and similar factors, are employed to obtain the information necessary to move the lenses to constantly change the image size and maintain the subject in focus at the same time. It is obvious that a single lens can now carry out the desired magnification, and allows for an infinite range, as against the older systems of substitute lenses or complicated adjustments. An example of the movements of the lens illustrated is found in Figure 3. The distance in inches is measured against the magnification in inches. Thus, the distance between lens 18 and the subject is found in the formula:

$$u = \left(\frac{1}{M} + 1\right) F$$

and the distance from lens 18 to the image is found in the formula:

$$v = (M+1) F$$

where:

$u$ = lens to subject distance
$v$ = lens to image distance
$M$ = magnification
$F$ = focal length U represents a linear ratio of the magnification of the image and is shown as a straight line 28 while $v$ is a curved ratio of magnification of the image and is illustrated at 30. The spiral groove 26, which produces the curved line 30 maintains the correct focal distance to the image. Since the depth of focus is kept constant, the object is always in focus. The invention is illustrated in position for $M=1$ and, when barrel 14 is moved by rotation of cylinder 12 towards the image orthicon pickup 32, the apparent focal length of the entire lens assembly gets smaller, the images becoming smaller as the field of view increases. Conversely, when barrel 14 is moved towards the lens system 34 near the subject, the image gets larger and the field of view decreases. In the illustration, a 1 to 4 magnification is provided with cam groove 26 maintaining the relationship of U to V. Obviously other magnification ratios could be employed and still be within the inventive concept.

The device 10 is mounted on a supporting base 36, with image housing barrel 16 maintained fixed by means of posts 38, while subject housing barrel 14 is held in axial alignment with barrel 18 by means of one or more posts 40 having an arcuate cradle section 42 thereby holding barrel 14 for horizontal movement as cylinder 12 rotates. A knurled operating collar 44 on cylinder 12 extends outwardly of the barrels 14 and 16, allowing the fingers of the operator to grasp said collar to rotate cylinder 12.

Complementary threads 46, on barrel end 48 of lens housing 14, cooperate with threads 24 on cylinder 12 to provide linear movement with rotation of cylinder 12. Lens system 34 is retained in a barrel housing 50 which is threaded at 52 to fit into the free end of barrel 14. Adjustment of lens 34 by means of the threaded engagement with barrel 14 provides means to maintain the subject in proper focus.

Barrel 16 includes an end wall 54. However, instead of being threaded, a pin extension 56 rides in spiral groove 26. Barrel 16 is connected with the image pickup tube 32 by an desired fastening means 58.

In operation, a subject (not shown) is projected by means of lens 34 into lens member 14 to focus at X as a real image. This image is viewed at 32, having been magnified by lens assembly 18 to a desired value. Thus, in the example given for purposes of illustration, lens 18 has a focal length of about one inch and when M is magnified at one inch, the total distance of $U$ plus $V$ is four inches. When M is a maximum magnification of four inches, the total distance of $U$ plus $V$ is 6.5 inches. When other lenses 18 of different focal lengths are used, $U+V$ is multiplied by the focal length in inches to obtain the correct values.

When lens assembly 12 is rotated to cause housing 14 to move linearly towards the left in a horizontal line, the image gets smaller. However, by virtue of the spiral movement of cylinder 12, due to the cam structure 26, cylinder 12 moves at an increasingly faster rate than lens barrel 14 to maintain the relationship of U to V for values of M from 1 to 4. This magnifies the image, as predetermined by the values given in the example while the correct focus is maintained. It thus requires movement of only one component part of the device to automatically provide the required magnification with the subject in focus at all times. In this manner, the necessity for substituting lenses with the complex adjustments required is avoided, and a simple device, capable of being operated by non-technical help, is obtained.

Obviously many modifications and variations of the present invention are possible in the light of the above teachings. It is therefore to be understood that within the scope of the appended claims the invention may be practiced otherwise than as specifically described.

What is claimed is:

1. A fixed focus variable magnification device comprising an elongated cylinder housing, a thread means on the external surface of said cylinder housing, a subject lens barrel rotatably mounted on said thread means, a cam track on the external surface of said cylinder housing, an image housing barrel mounted on said cam track, pin means in said image housing barrel extending into cam track and collar means on said cylinder housing, whereby rotation of said cylinder housing will move said subject lens barrel linearly in relation to said image housing barrel.

2. A fixed focus variable magnification device comprising an elongated cylinder housing, a thread means on the external surface of said cylinder housing, a subject lens barrel rotatably mounted on said thread means, a cam track on the external surface of said cylinder housing, an image housing barrel mounted on said cam track, pin means in said image housing barrel extending into cam track and collar means on said cylinder housing, whereby rotation of said cylinder housing will move said subject lens barrel linearly in relation to said image housing barrel, said cylinder housing, subject lens barrel and said image housing barrel being in axial alignment.

3. A fixed focus variable magnification device comprising an image housing barrel, means retaining said image housing barrel in stationary position, a subject housing barrel spaced from said image housing barrel, means supporting said image housing barrel for rotatable movement, aligned openings in said image and subject housing barrels and a lens cylinder mounted in said aligned openings, said lens cylinder having means cooperating with said image housing barrel to obtain a curved line motion, means cooperating with said subject housing barrel to obtain a straight line motion and means on said lens cylinder adapted to rotate the latter, said lens cylinder moving longitudinally in a curved line ratio with respect to the image housing barrel and the subject housing barrel moving longitudinally in a straight line ratio with respect to the lens cylinder, whereby a subject is magnified while the image is automatically retained in focus.

References Cited in the file of this patent

UNITED STATES PATENTS

| | | |
|---|---|---|
| 1,174,547 | Clason | Mar. 7, 1916 |
| 1,755,105 | Douglass | Apr. 15, 1930 |
| 1,790,232 | Flora | Jan. 27, 1931 |
| 1,898,471 | Walker | Feb. 21, 1933 |
| 1,947,669 | Warmisham et al. | Feb. 20, 1934 |
| 1,950,166 | Durholz | Mar. 6, 1934 |
| 2,165,341 | Capstaff et al. | July 11, 1939 |
| 2,179,850 | Glancy | Nov. 14, 1939 |